March 27, 1962  R. C. CARLSON ET AL  3,027,497
ELECTRO-MECHANICAL REMOTE CONTROL SYSTEM
Filed June 15, 1960  4 Sheets-Sheet 1
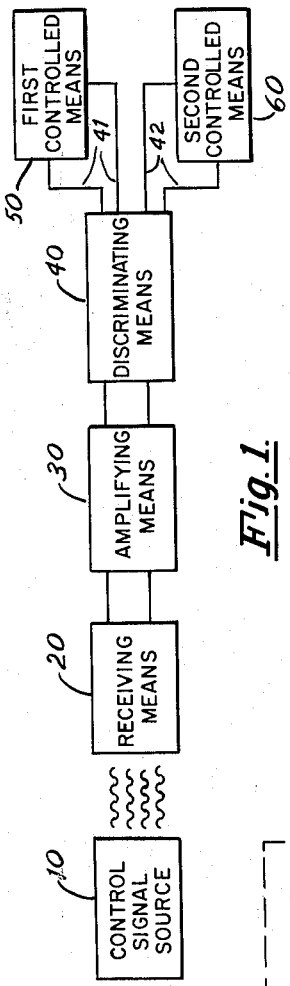
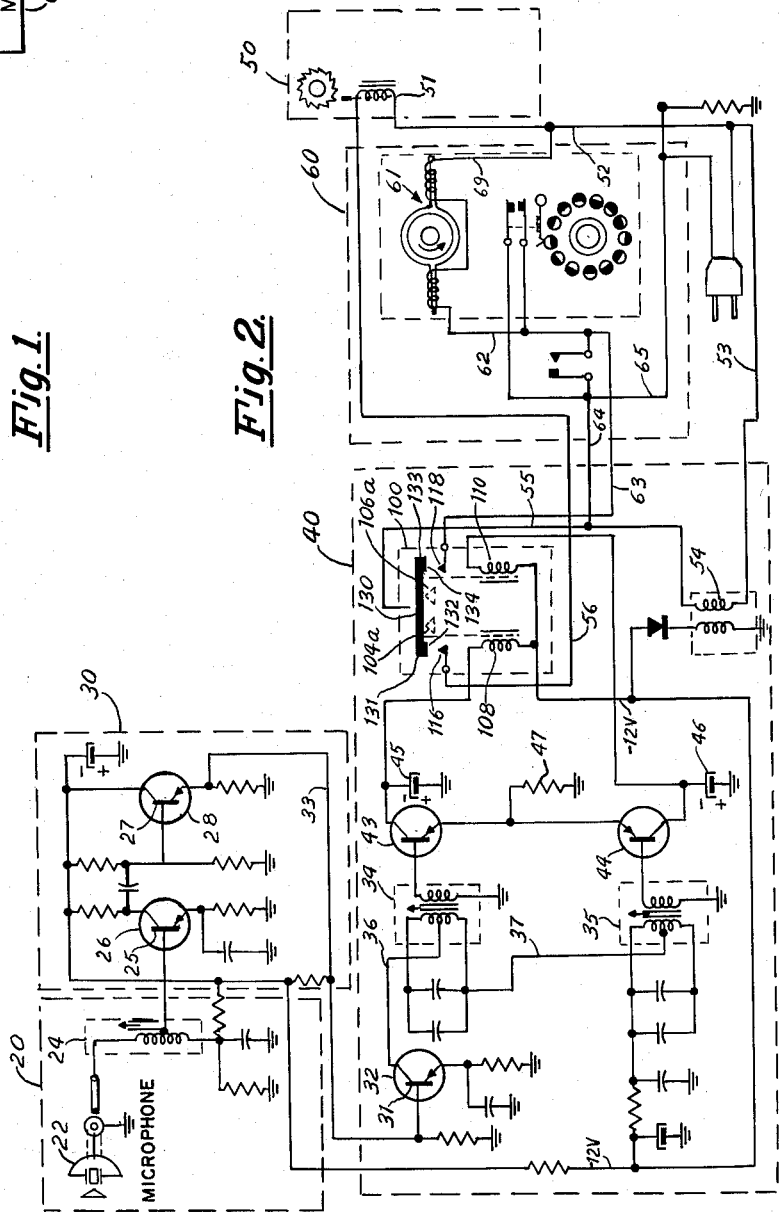
INVENTOR.
Reuben C. Carlson
Ray B. Schrecongost
William G. Henke
By John L. Wiegreffe
ATTY.

INVENTORS.
Reuben C. Carlson
Ray B. Schrecongost
William G. Henke
By John L. Wiegriffe
ATTY.

March 27, 1962 R. C. CARLSON ET AL 3,027,497
ELECTRO-MECHANICAL REMOTE CONTROL SYSTEM
Filed June 15, 1960 4 Sheets-Sheet 3

INVENTOR.
Reuben C. Carlson
Ray B. Schrecongost
William G. Henke
By John L. Wiegreff
ATTY

United States Patent Office 3,027,497
Patented Mar. 27, 1962

3,027,497
ELECTRO-MECHANICAL REMOTE CONTROL SYSTEM
Reuben C. Carlson, Bensenville, Ray B. Schrecongost, Park Ridge, and William G. Henke, River Grove, Ill., assignors to Admiral Corporation, Chicago, Ill., a corporation of Delaware
Filed June 15, 1960, Ser. No. 36,223
9 Claims. (Cl. 317—147)

This invention relates to remote control systems for individually controlling a plurality of utilization means in response to selected frequency control signals, each of which has a different predetermined frequency.

More particularly, this invention relates to remote control systems utilizing ultrasonic control signals, in which a high degree of immunization from unwanted or spurious signals is realized. The high degree of immunization is effected by the use of a novel electro-mechanical discriminator in the output stages of the remote control system, such that discrimination between signals is at an extremely high level to prevent actuation of the selected utilization means when two or more received signals including the desired signal are closely related in amplitude and frequency.

One of the main objectives of a remote control system is that it respond to a desired signal and not to noise. Therefore, a method is required to differentiate between a single desired frequency signal and a noise signal of many frequencies, including the desired frequency signal.

Many types of frequency discriminator circuits are known in the art. In particular, one well known type employs a pair of tuned circuits connected in either a series or parallel manner across the output circuit of an amplifier. The tuned circuits are coupled to a pair of diodes which are arranged to have their output circuits connected in opposition. Thus, in the presence of a signal, having the same frequency as the resonant frequency of one of these tuned circuits, the associated diode conducts and a certain polarity output is obtained. In the presence of a signal having the same frequency as the resonant frequency of the other tuned circuit, the other diode conducts and an opposite polarity output is obtained. Likewise, in the presence of both signal frequencies the output will vary both in amplitude and polarity, in accordance with the relative strength of the signals.

In general, this type of circuit is used for switching, that is, selecting a particular utilization means responsive to receipt of a corresponding control signal. In particular, frequency selective circuits of this type have been employed for the remote control of television receivers. In such devices a frequency selective arrangement, as mentioned above, is commonly used and the diode output voltages are individually impressed upon a biasing arrangement to effect the "on" and "off" control of a relay tube. Assuming that a control signal of a particular frequency is received, the voltage developed across the diode and connected to the tuned circuit corresponding to this control signal frequency, is effective to change the bias on its associated relay tube and allow the relay tube to conduct. Upon conduction, a control relay, which is generally located in the output circuit of the relay tube, is energized sufficiently to effect operation of its contacts and the particular control function is then initiated.

Many such systems are in use today and, while on the whole they perform their functions satisfactorily, some improvement in efficiency and reliability is desirable. Referring particularly to those systems which employ ultrasonic control signals for actuation of the corresponding utilization means, it has been generally necessary to employ critically tuned discriminator circuits, since the frequency and separation of the various control signals is not very great. In these systems malfunctions often occur for various reasons. Some of these are: presence of extraneous ultrasonic noise signals at or near the frequencies of the discriminator circuit; reflections of the signals from nearby objects; misalignment of the tuned circuits; and combinations of the above. In addition, the noise or extraneous signal appears as random spikes of varying amplitude and frequency. Thus, it would be desirable to provide means whereby upon receipt of a desired control signal the circuit response to other undesired signals of the same or similar frequencies is inhibited. Therefore, it is an object of this invention to provide a remote control system having a relatively high degree of immunity to spurious signals, and in addition, to provide an electro-mechanical device capable of substantially increasing that high degree of immunity to effect substantially total immunity.

Another object of the invention is to provide an electro-mechanical discriminator for spurious or extraneous signal immunity, which is both electrically and mechanically responsive to a plurality of signals of various amplitudes and frequency to deliberately magnify the effect of the extraneous signal when compared to the desired signal to prevent actuation of the utilization means, under these conditions.

It is a further object of this invention to minimize the effect of short duration, sharp peaked pulses of noise signals which encompass the desired frequency band by first: reducing the effective peak amplitude of the noise signals at the discriminator by making the discriminator frequency sensitive to a great degree; and secondly, to provide a stable platform for the discriminator, by means of a dual fulcrum, which prevents actuation by a short duration, sharp peaked pulse due to the inherent lag effect or resistance to slight movement caused by the stable platform, in contradistinction to a conventional single pivot relay with two coils which operates on a minute difference in signal.

This object is attained by the cancellation effect of the broad band noise which may contain substantial amplitude noise peaks at each of the desired frequencies under no signal input conditions or alternatively when the noise peak is at the opposite desired frequency from the selected desired frequency during signal input conditions.

The invention further resides in the construction, combination and arrangement of parts illustrated in the accompanying drawings, and while there is shown therein preferred embodiments, it is to be understood that they are susceptible of modification and change, and other details, arrangements of parts, features and constructions, may be employed without departing from the spirit of the invention.

The invention and other objects will be more readily apparent from a reading of the following specification, taken in conjunction with the drawings, in which:

FIG. 1 is a block diagram of an ultrasonic remote control system in which the invention is applicable;

FIG. 2 is a partial schematic diagram of a portion of the block diagram of FIG. 1;

Figure 3:
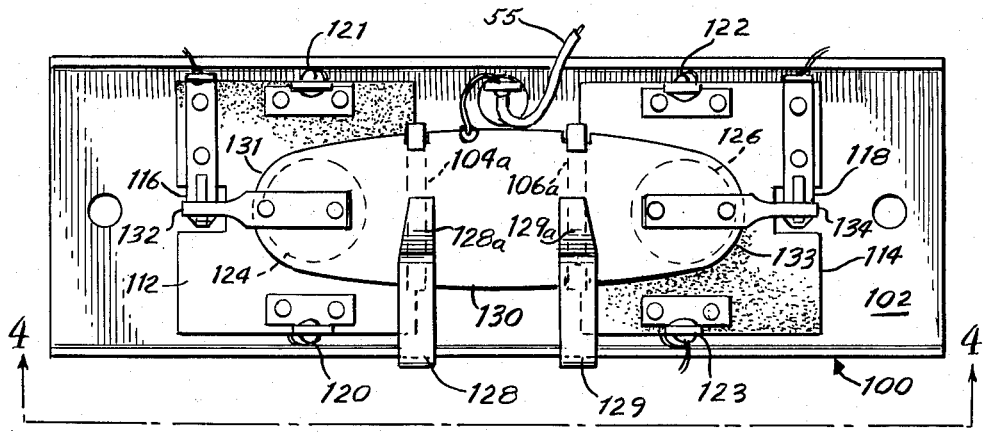
FIG. 3 is a top plan view of a preferred embodiment of the electro-mechanical discriminator.

In FIG. 1 there is shown a source of selective control signals 10, which is capable of transmitting at least two control signals of different frequencies. The source of control signals 10 may, for example, be an actuator or transmitter containing a number of tuned ultrasonic rods and means for individually striking them. The actuator is generally small enough to be held in the hand of the operator and buttons corresponding to the individual rods are labelled according to function, such as, "Volume," "Station Selection," etc. Of course a separate control channel is required for each control button. As an example of such a transmitter in the art, there is a U.S. Patent No. 2,868,156, issued January 13, 1959, to R. E. De Cola et al., assigned to the same assignee herein.

To effect operation of a remote control system of the type herein, the operator depresses the button corresponding to the control function desired. An ultrasonic wave of a particular frequency is then propagated through the air and is received by a suitable receiving unit in a receiving means 20. The output of receiving means 20 is then coupled to the input of amplifying means 30, the output of which is coupled to discriminating means 40. Discriminating means 40 may include a plurality of signal translation control channels and a corresponding plurality of outputs 41 and 42, the representative two of which are illustrated in FIG. 1. These outputs 41 and 42 are shown connected to utilization or controlled means 50 and 60, respectively. As shown, the apparatus of FIG. 1 is designed to actuate controlled means 50 in the presence of a control signal of one frequency, and controlled means 60 in the presence of a control signal of another frequency. In one application, for example, controlled means 60 might contain circuitry for automatically changing the station tuning of the television receiver, and controlled means 50, circuitry for varying the volume level of the same receiver.

In FIG. 2 there is schematically shown an electro-mechanical discriminator in the dashed block 100, which is an integral and important part of the discriminating means 40. Structural features of the discriminator 100 are more fully detailed in FIGS. 3 and 4, in which a base 102 is provided for supporting the components. A pair of L-shaped legs 104 and 106 are secured to the base 102 by any suitable means. Each of the legs 104 and 106 supports one of a pair of electro-magnetic coils 108 and 110, respectively. Each of a pair of insulation pieces 112 and 114 is affixed to one of the coils 108 and 110 to support fixed contacts 116 and 118, and coil connectors 120-123 inclusive. The pieces 112 and 114 are centrally apertured to accommodate cores 124 and 126 for each of the coils 108 and 110, respectively.

An armature 130 is dually pivoted on upper slotted fulcrum portions 104a and 106a of legs 104 and 106, respectively. A pair of L-shaped spring members 128 and 129 are secured at one end of the base 102, each of which has opposite flexing ends 128a and 129a for biasing the armature 130 against its juxtaposed fulcrum 104a. This spring arrangement, by applying force at the respective pivots thereby facilitates the adjustment of the discriminator to simplify calibration of the dually pivoted armature 130.

Each of the ends 131 and 133 of the armature 130 is provided with movable contacts 132 and 134, respectively, for cooperative association with the fixed contacts 116 and 118, respectively. The circuit controlling function of contacts 116—132 and 118—134, and the operation of the discriminator 100 will be more fully explained hereinafter in connection with the detailed description of FIG. 2.

Figure 4:
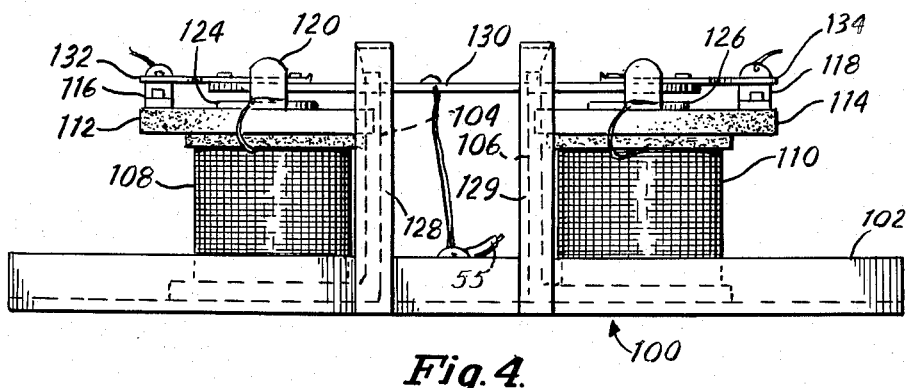
FIG. 4 is a side view taken along the lines of IV—IV of FIG. 3.
Figure 5:
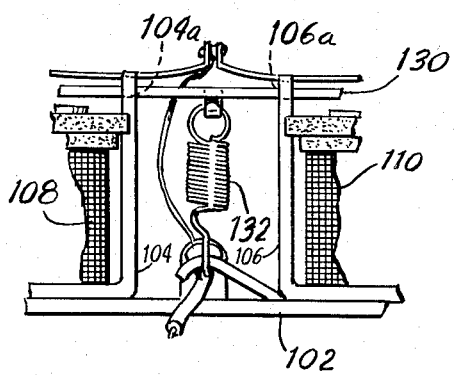
FIG. 5 is a fragmentary view similar to FIG. 4, showing a modified form of the electro-mechanical discriminator of FIGS. 3 and 4.

In FIG. 5 there is shown a fragmentary portion of the electro-mechanical discriminator of FIGS. 3 and 4, with a modified spring arrangement. As shown, a single spring 132 is utilized to centrally bias the armature 130 against the dual fulcrum portions 104a and 106a. This single spring arrangement does not materially change the operative features of the discriminator, but does simplify the manufacturing aspects and the cost thereof. In all other respects, the modification of FIG. 5 is identical to the preferred embodiment shown in FIGS. 3 and 4.

Figure 6:
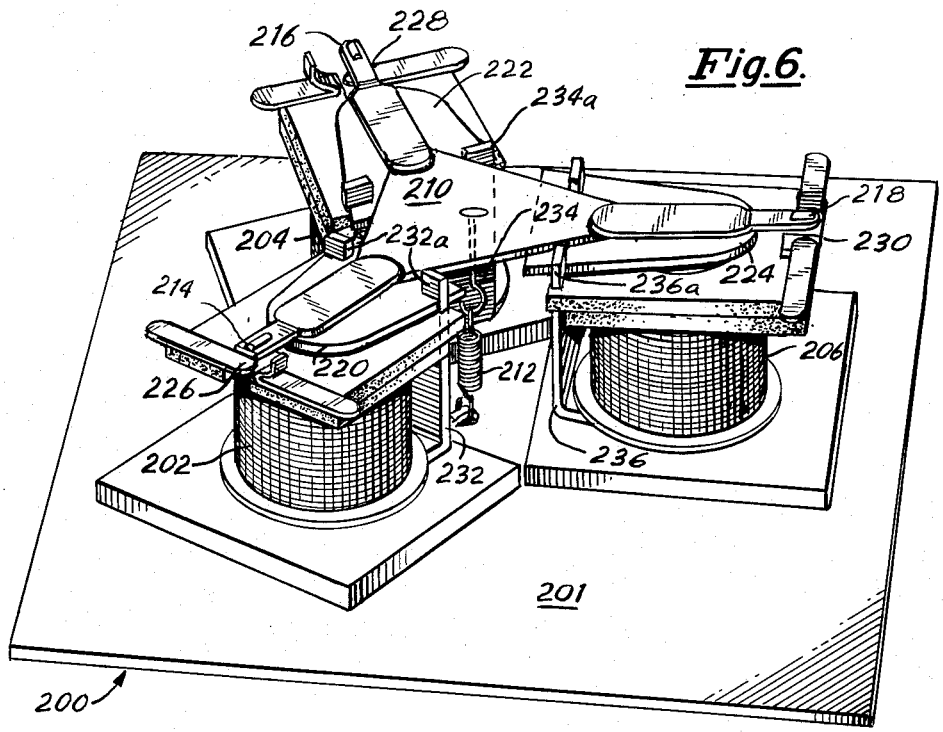
FIG. 6 is a perspective view of a three function modification of the discriminator of FIGS. 3 and 4.

In FIG. 6 there is shown a modification of the electro-mechanical discriminator of FIGS. 3-5 inclusive. The discriminator 200 provides for three function discrimination by the use of three symmetrically arranged coils 202, 204 and 206 which affect a single armature 210. A single spring 212 is centrally located and connected between the armature 210 and the base 201. The spring 212 serves to bias the armature 210 into its stable or equilibrium position whereby the movable contacts 214, 216 and 218, mounted on the triangular extensions 220, 222 and 224, respectively, are out of engagement with the fixed contacts 226, 228 and 230, respectively. Three L-shaped legs 232, 234 and 236 are provided, similar to legs 104 and 106, to provide fulcrum portions 232a, 234a, and 236a for each of the triangular extensions 220, 222 and 224, respectively of the armature 210. In the stable or equilibrium position, the armature 210 rests on all three of the fulcrum portions 232a, 234a and 236a.

In the embodiment of FIG. 6 the symmetrical arrangement is such that only one function may be obtained at any one time. The armature 210 is adjusted so that it is at its equilibrium position, as shown, with no signal input to any of the coils 202—204—206. In the presence of a desired signal at coil 202, the armature end 220 will pivot around the fulcrum 232a to effect closure of contacts 214—226. Similarly, a signal at coil 204, results in the pivoting of armature end 222 around fulcrum 234a to close contacts 216–228, and a signal at coil 206, results in the pivoting of armature end 224 around fulcrum 236a to close contacts 218–230. Thus signals appearing simultaneously at more than one coil will be effectively neutralized, by the mechanical cancellation effect resulting from the particular construction shown herein.

It is apparent that more than three function discrimination may be obtained by various combinations of the two function discriminator of FIGS. 1, 2, 3 and 4 and the three function discriminator of FIG. 6. For example two of the two function discriminators 100 may be arranged in tandem to provide four function discrimination with only duplication of the circuitry shown required. Also a two function discriminator and a three function discriminator may be combined to provide five function discrimination when required. It is also apparent that a symmetrical arrangement using a single armature with four legs arranged at right angles to each other could be used with four coils and four fulcrums to accomplish four function discrimination in a manner similar to that shown in the preferred embodiment disclosed herein.

Referring now to FIG. 2, there is shown a circuit diagram, partly in schematic form, for the remote control system at the receiving end, i.e., the blocks 20, 30, 40, 50 and 60 of FIG. 1.

The receiving means 20 includes a microphone 22, which responds to ultrasonic signals from the transmitter or source of control signals 10 (not shown) and converts such signals into electrical signals of the same frequency. For example, two such control signals which are utilized may be frequency signals of 38.285 kilocycles per second and 41.805 kilocycles per second (hereinafter abbreviated as kc.). In view of the general characteristics of microphones, and particularly those which accept a band of frequencies between 37 kc. and 44 kc., spurious or extraneous signals within this frequency band will also be accepted at the microphone and translated into corresponding electrical signals of the same frequencies.

The electrical control signal of either selected frequency and any spurious signals which may be present are fed to a tuned input circuit 24. The circuit 24 is tuned to either of the desired frequencies, depending upon the capacitance characteristics of the microphone 22. For example, if the microphone 22 inherently favors the 38.285 kc. to the detriment of the 41.805 kc. signal, then the circuit 24 is tuned to the 41.805 kc. signal, or vice versa. Because of the relatively wide band characteristics of the tuned circuit 24 and the microphone 22, a band of frequencies between approximately 37 kc. to 44 kc., is accepted.

The output of the tuned circuit 24 is fed to the base 25 of transistor amplifier 26, for amplification thereby. The amplified output of transistor 26 is fed to the base 27 of an emitter-follower transistor 28. Transistor 28 and its corresponding circuitry are provided to effect isolation between the amplifier stages, and to compensate for wide beta variations by inherent degeneration, as well as further amplification of the signal. Further stages of amplification, similar to the circuits of transistors 26 and 28, may be provided, but the description of such stages is not deemed necessary due to the similarity thereof.

The output of transistor 28 is fed to the base 31 of a driver amplifier 32 via conductor 33. The amplified signal output of transistor 32 is developed across either or both of a pair of tuned circuits 34 and 35 connected in the output circuit of transistor 32. The tuned circuit 34 includes a tuneable coil which is tuned to 41.805 kc. The tuned circuit 35 includes a tuneable coil which is tuned to 38.285 kc. Thus at this point, either of the selected control signals will be fed to their individual relay control transistors 43 and 44. For example, if the source of control signals 10 has been actuated to supply a 41.805 kc. control signal to effect operation of utilization means 50 then the tuned circuit 34 will accept the amplified 41.805 kc. signal to drive the transistor 43. During this time transistor 44 will not conduct due to the rejection of the 41.805 kc. signal at the tuned circuit 35. Conversely, if the originating control signal is 38.285 kc. then the transistor 44 will conduct and the transistor 43 will be blocked. Thus, in normal and desired operation a single control signal is fed to the electro-mechanical discriminator 100. Obviously, the tuned circuits 24, 34 and 35 have effected substantial discrimination between signals throughout the control system so that the system response characteristic at either input to discriminator 100 is somewhat peaked and covers a relatively narrow band of frequencies.

For the purpose of introducing a relatively long time constant for the desired control signal, integrating circuits are present. These circuits include: capacitor 45, the internal capacity of transistor 43 and resistor 47 for the 41.805 kc. signal; and capacitor 46, the internal capacity of transistor 44 and resistor 47 for the 38.285 kc. signal. The selection of capacitor and resistor values is determined by the inherent capacity of the transistors and the optimum time constant which is desired. The effect of these circuits is to charge capacitor 45 or capacitor 46 during the transmission of a desired signal so that the respective coil 108 or 110 is not energized sufficiently to actuate armature 130 until a signal having a predetermined minimum amplitude for a predetermined minimum time interval has been received. This effectively counteracts the short duration extraneous or noise signal in another respect, i.e., from the temporal standpoint.

Figure 10:
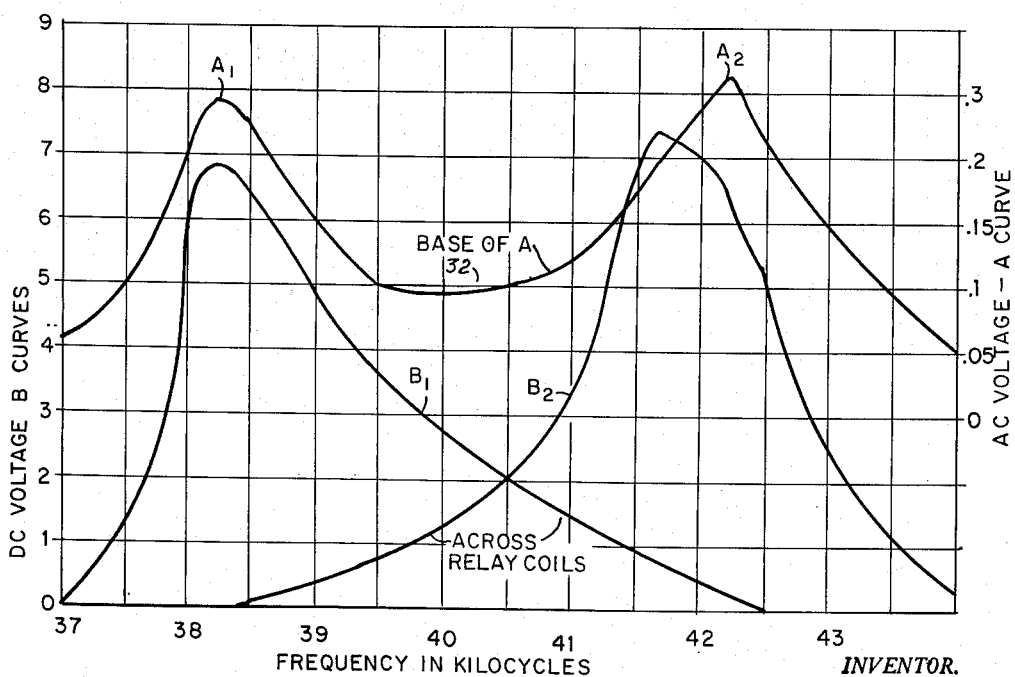
FIG. 10 is a graph of curves comparing voltages across the discriminator which illustrates the effect of the discriminator.

Further explanatory material regarding the effect of the discriminator 100 is illustrated in FIG. 10. For example, in FIG. 10 a curve A illustrates the A.C. voltage appearing at base 31 of transistor 32 for various frequencies with a representative signal input to the control system. Note that the peaks $A_1$ and $A_2$ are substantially at the desired control signal frequencies of 38.285 kc. and 41.805 kc., respectively. However the midportion of curve A shows that the system has substantial response over a range of frequencies, so that noise or spurious signals within the bandwidth of 37 kc. to 44 kc., if they are of sufficient amplitude, would effect faulty operation of the remote control system. Thus the present invention is designed to effect improved operation by the addition of further discrimination to prevent faulty operation in the presence of spurious noise signals of substantial amplitude. This added discrimination is accomplished by the electro-mechanical discriminator 100.

In the electro-mechanical discriminator 100, an amplified control signal of 41.805 kc., which is fed through transistor 43 will be impressed across coil 108 with sufficient amplitude to attract the end 131 of armature 130. In the absence of a substantial opposing signal across coil 110, the discriminator 100 will operate to close contacts 116—132. This completes a circuit to energize the coil 51 of a first controlled means 50 from the lower side of the line plug, over conductor 52, through coil 51, over conductor 56, through contacts 116—132 of armature 130, through armature 30 to conductor 55, and back to the upper side of the line plug through conductors 64 and 65. The first controlled means 50 may comprise a stepping relay which is actuated by the coil 51 to effect the on-off and volume control of a television receiver, for example. However the controlled means 50 could also be used in conjunction with control functions for movie and slide projectors, garage door openers, etc. Thus the illustrated controlled means 50 is merely representative of a typical utilization means for the remote control system described herein and forms no part of the invention as such.

In the event that an amplified control signal of 38.285 kc. is fed to the coil 110, via the transistor 44, in the absence of substantial amplitude signals in the opposing 42 kc. region, the discriminator 100 reacts as follows: the energization of coil 110 attracts the end 133 of armature 130 to move the armature about the fulcrum portion 106a to close contacts 118 and 134. The closure of contacts 118—134 completes a circuit for a motor 61 of the controlled means 60 as follows: from the lower side of the line voltage plug, over conductor 52, over conductor 69, through the windings of motor 61, over conductor 62, over conductor 63, through contacts 118—134 of armature 130, through armature 130, over conductor 55, and back to the upper side of the line plug over conductors 64 and 65. The second controlled means 60 may comprise a motor operated channel selector for a television receiver, for example, but similar to controlled means 50, it may also comprise structure for operatively controlling functions of different apparatuses.

The operation of the discriminator under adverse conditions, i.e., in the presence of undesired or extraneous signals within the 37 kc. to 44 kc. frequency band may be further explained by reference to FIG. 10. The curve B1 shows representative D.C. voltages appearing across the relay coil 110, and is seen to be substantially peaked at 38.285 kc. When a desired control signal of that frequency has been received, discriminator 100 will be actuated. Similarly the curve B2 shows representative D.C. voltages appearing across the relay coil 108, and is seen to be substantially peaked at 41.805 kc. When a desired control signal of that frequency has been received, discriminator 100 will be actuated. Note that the voltage amplitudes of these curves (measured in D.C. volts) indicate substantial attenuation for signals between 37 kc. and 44 kc. which are not at the desired frequencies. Therefore it is clear that spurious signals at frequencies of 37.5, 39.5, 40.5, 41 and 43 kc., for example, are substantially attenuated. However, spurious signals approximately at the desired frequencies of 38.285 kc. and 41.805 kc. will be handled in the following manner. If the desired control signal is 38.285 kc., which has been heretofore transmitted by the control signal source 10, and a spurious signal of the same frequency is generated from an outside source the system will operate in the desired manner, because the undesired signal is merely cumulative with the desired signal. Assume the same desired signal conditions, i.e. 38.285 kc. Assume further that a substantial amplitude spurious signal appears in the 41.805 kc. range. Discriminator 100 will not operate during the time duration of the peaked spurious signal. However, the longer time duration of the desired signal eventually will cause operation of the discriminator 100, since both amplitude and duration of the signal are factors to be considered. Thus the short duration, sharply peaked spurious signal in the 41.805 kc. range energizes coil 108 while the relatively long duration desired control signal of 38.285 kc. energizes coil 110 to maintain temporary equilibrium of armature 130. Subsequently, de-energization of coil 108 occurs after disappearance of the short duration spurious signal, and armature 130 pivots clockwise (FIGS. 2 and 4) to close contacts 118—134. Referring to FIG. 4, the actuating action just described accomplishes two functions: one, the closing of contacts 118—134; and two, the further desensitization of coil 108. The latter function is accomplished by the pivoting action of armature 130 around the fulcrum 106a which widens the gap between end 131 of armature 130 and the core 124 of coil 108, thus requiring a substantially stronger signal at coil 108, or the absence of a signal at coil 110 to restore the armature 130 to its equilibrium position. Thus the effect of a re-occurring spurious signal of 41.805 kc., is substantially nullified unless it is of very great amplitude, which is a rare occurrence. The system overload capabilities further limits the maximum signal amplitude which may be translated therethrough.

At equilibrium, however, the effect of a spurious signal of opposite frequency, i.e., if the desired signal is 41.805 kc. and the spurious signal is substantially 38 kc., or vice versa, is different. Then the stable platform, comprising the dual fulcrums 104a—106a, for the armature 130, magnifies the effect of a relatively weak spurious signal to prevent actuation by the desired signal. This is accomplished by the mechanical advantage, to be hereinafter discussed in connection with FIGS. 7, 8 and 9, which allows a weak spurious signal to counteract the effect of a stronger desired signal for a period of time dependent upon the duration of the spurious signal. This is desirable to prevent operation in the presence of spurious signals which may cause chattering or spasmodic operation of the discriminator 100.

Due to the nature of noise signals which generally comprise spikes of signal over a wide frequency range, noise or spurious signals in the 37 kc. to 44 kc. range cause a further cancellation to be effected by the discriminator 100. When spurious signals within this range are amplified they appear in the collector circuit of driver-amplifier 32. Any substantially equal amplitude signals of 38.285 kc. and 41.805 kc. cause current to flow in transistors 43 and 44 simultaneously. This will cause energization of both coils 108 and 110, each of which will attempt to attract its corresponding armature end. The substantially equal magnetic force on each side of the armature 130 is effectively neutralized since the stable armature platform, composed of fulcrums 104a and 106a, resist armature actuation under minor differential energy conditions. This cancellation effect emphasizes the importance of the electro mechanical discriminator. As hereinafter explained in the discussion of FIGS. 7, 8 and 9, even substantial amplitude differences between spurious signals appearing simultaneously at coils 108 and 110 result in no actuation of the discriminator 100 because of the mechanical advantage which is available for the weaker signal due to the dual fulcrum arrangement. Thus it can be appreciated that the combination of electrical frequency discrimination in the transistorized circuit plus the mechanical cancellation effect of the discriminator 100 effectively obtains noise or spurious signal immunization of the highest degree, commensurate with the signal power design requirements set for the system.

The function of discriminator 100 may be further explained by reference to FIGURES 7, 8 and 9 in which the effects of various forces are defined commensurate with the signal power design requirements set for the system.

Figure 7:
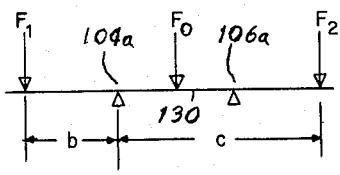
FIG. 7 is a force diagram for the electro-mechanical discriminator of FIG. 5.

The discriminator may be described by considering the diagram in FIG. 7. As used herein: relay number 1 comprises the coil 108, its corresponding core, armature end 131, leg 104, fulcrum 104a, and contacts 116—132; relay number 2 comprises the coil 110, its corresponding core, armature end 133, leg 106, fulcrum 106a, and contacts 118—134.

$F_1$ and $F_2$ represent the forces by the relays on the armature 130 and $F_0$ denotes the force by the spring tension. The dimensions $b$ and $c$ represent the distances from the forces to one fulcrum 104a. Only one fulcrum need be considered for analysis since the configuration is symmetrical. By equating the moments about the left fulcrum for equilibrium, it can be shown that $$\frac{F_2}{F_1} = \frac{1}{c}\left[b - \frac{F_0(c-b)}{2F_1}\right]$$

This equation represents the general condition for equilibrium. In the above equation when $c=2b$ $$\frac{F_2}{F_1} = 1/2 - \frac{F_0}{4F_1}$$

The left member of the equation is shown as a fraction so that $F_2$ can be determined as the percentage of $F_1$ necessary to maintain equilibrium with $F_1$ applied.

Figure 8:
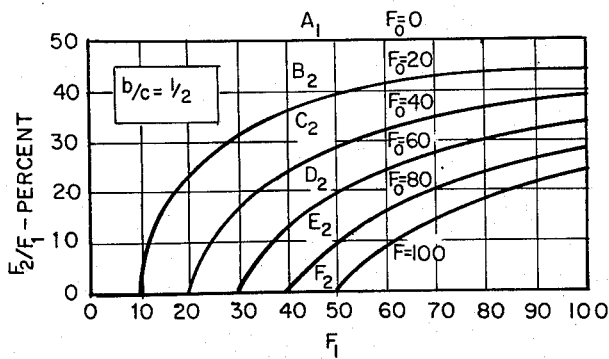
FIG. 8 represents a graph of various curves indicating relations for equilibrium of the electro-mechanical discriminator.

FIG. 8 shows how much force is needed by relay number 2 to maintain equilibrium for a given force by relay number 1 for different spring tensions. For example: with a spring tension of 40 grams and a force of 25 grams by relay number 1, relay number 2 need only have 10% of the force by relay number 1 or 2.5 grams to prevent actuation. Stated another way, only 10% of the adjacent frequency signal is needed to prevent operation of the discriminator. For a given $b/c$ ratio the spring tension is determined by the sensitivity required, therefore a more usable characteristic is shown in FIG. 9.

Figure 9:
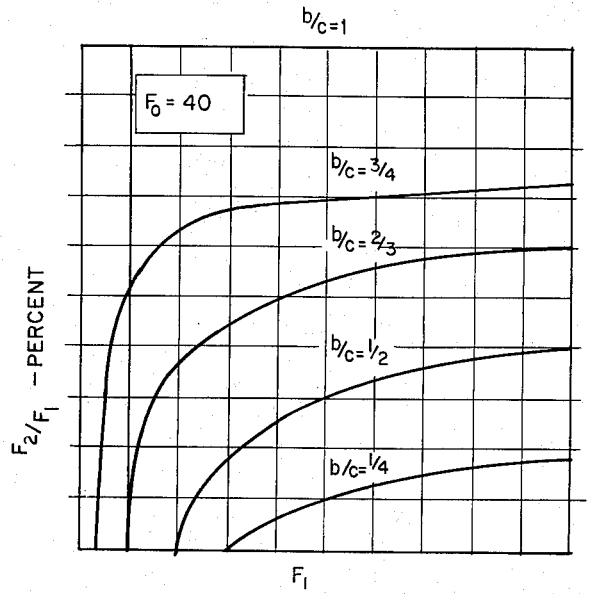
FIG. 9 is a graph of curves illustrating relations for equilibrium for the electro-mechanical discriminator under different conditions from those of FIG. 8.

FIG. 9 shows how much force is needed by relay number 2 to maintain equilibrium for a given force by relay number 1 for different $b/c$ ratios or fulcrum spacings. As $b/c$ becomes less, the fraction of $F_1$ required to maintain equilibrium becomes less and therefore, better noise immunity is achieved as $b/c$ is reduced. The limit to which $b/c$ can be reduced is determined by the Q and frequency separation of the tuned tanks in the driver stage (transistor 32). The Q and frequency separation dictate how much signal will be present in the adjacent channel when a desired signal with no interference is present. If $F_1$ denotes the signal channel and $F_2$ denotes the adjacent channel, then the "splash-over" into the adjacent channel may be expressed as a percent of the desired signal or $F_2/F_1$.

If this "splash-over" percent is drawn in on FIG. 9, the point at which it intersects the desired $b/c$ ratio curve determines the relay sensitivity to a pure desired signal. Therefore, the lower the $b/c$ ratio becomes, the greater must be the tank circuit Q's or frequency separation to maintain a constant sensitivity.

Thus it may be said that the required factors necessary in determining the relay fulcrum spacing are the relay sensitivity, the frequency separation of the desired signals, and the Q of the frequency selector circuits.

Thus it may be said that the particular combination of electronic circuitry, which includes all transistors, is modified by an electro-mechanical device which provides a high degree of discrimination due to its mechanical stability which furnishes a stable platform for the armature which, in turn, renders the discriminator insensitive to slight current variations between the two coils.

Further, it is contemplated that the invention may be used to control a single utilization means in response to a single control signal whereby noise or spurious signal immunization is desired.

The detailed description of the particular embodiments of the invention illustrated and described herein is not to be construed as limiting the invention thereto. The invention includes all features of patentable novelty residing in the foregoing description and the accompanying drawings.

What is claimed is:

1. In combination; translation means having a common input circuit and at least two output circuits for receiving and translating at least two control signals having predetermined individual characteristics and predetermined common characteristics; first means in said translation means for segregating said control signals according to said predetermined individual characteristics; second means in said translation means coupled to said first means for energizing respective ones of said output circuits responsive only to signals having said predetermined common characteristics; electromechanical means including at least two flux producing coils individually coupled to respective ones of said output circuits, said electromechanical means having a common armature movable in different directions in accordance with which one of said coils is energized, and including at least two spaced apart fulcrums about which said armature is selectively movable; and means for applying a mechanical force to said armature for resisting movement thereof about either of said fulcrums, the spacing of said fulcrums and the amount of said mechanical force being dependent upon the signal to noise ratio of said translation means and the minimum control signal power desired to move said armature.

2. A remote control system for selectively energizing a pair of utilization devices responsive to receipt of one of a pair of control signals of different frequencies lying within a fixed frequency band, said system being susceptible to spurious noise signals lying within said frequency band, comprising: receiving means for receiving and amplifying signals within said frequency band; frequency discriminating circuit means coupled to said receiving means for segregating said control signals on the basis of frequency, said frequency discriminating circuit means having a first output circuit energizable responsive to a first of said control signals and a second output circuit energizable responsive to a second of said control signals; electromechanical discriminating means including a first flux producing coil coupled to said first output circuit, a second flux producing coil coupled to said second output circuit, and a common armature resting upon a pair of spaced fulcrums and having ends adjacent to respective ones of said flux producing coils; a pair of utilization devices selectively energizable responsive to movement of a respective end of said armature toward its adjacent coil; said frequency discriminating circuit means and said electromechanical discriminating means coacting to inhibit movement of said armature in the presence of said spurious noise signals and to allow movement thereof in the presence of either one of said control signals, the spacing of said fulcrums being dependent upon the signal to noise ratio of said frequency discriminating circuit means and the minimum control signal power desired to cause energization of said utilization devices.

3. A remote control system for selectively energizing one of a plurality of utilization devices responsive to receipt of a corresponding one of a plurality of control signals of different frequencies lying within a fixed frequency band, said system being susceptible to spurious noise signals lying within said frequency band, comprising: receiving means for receiving and amplifying signals within said frequency band; discriminating means coupled to said receiving means including a corresponding plurality of tuned circuits, each tuned to the frequency of a different one of said plurality of control signals, for segregating said signals on the basis of frequency; said discriminating means having a plurality of output circuits individually energizable responsive to corresponding ones of said control signals; electromechanical discriminating means including a plurality of flux producing coils individually coupled to said output circuits and energizable therefrom, and a common armature resting upon a plurality of spaced fulcrums and having ends adjacent to respective ones of said flux producing coils, each of said fulcrums being adjacent to a respective one of said flux producing coils; a plurality of utilization devices individually and selectively energizable in response to movement of respective ends of said armature towards respective adjacent coils; said discriminating means and said electromechanical discriminating means coacting to inhibit movement of said armature in the presence of said spurious noise signals and allowing movement thereof in the presence of any single one of said control signals, the spacing of said fulcrums being dependent upon the signal to noise ratio of said discriminating means and the minimum control signal power desired to cause energization of said utilization devices.

4. A remote control system for selectively energizing a pair of utilization devices responsive to receipt of one of a pair of control signals of different frequencies lying within a fixed frequency band, said system being susceptible to spurious noise signals lying within said frequency band, comprising: receiving means for receiving and amplifying signals within said frequency band; frequency discriminating circuit means coupled to said receiving means for segregating said control signals on the basis of frequency, said frequency discriminating circuit means comprising a transistor having an output circuit including a pair of tuned circuits, each tuned to the frequency of a respective one of said control signals, a first one of said tuned circuits energizable responsive to receipt of a first one of said control signals and a second one of said tuned circuits energizable responsive to receipt of a second one of said control signals; electromechanical discriminating means including a first flux producing coil coupled to said first tuned circuit, a second flux producing coil coupled to said second tuned circuit and a common armature resting upon a pair of spaced fulcrums and having ends adjacent to respective ones of said flux producing coils; a pair of utilization devices selectively energizable responsive to movement of a respective end of said armature toward its adjacent coil; said frequency discriminating circuit means and said electromechanical discriminating means coacting to inhibit movement of said armature in the presence of said spurious noise signals and to allow movement thereof in the presence of either one of said control signals, the spacing of said fulcrums being dependent upon the signal to noise ratio of said frequency discriminating circuit means and the minimum control signal power desired to cause energization af said utilization devices.

5. A remote control system for selectively energizing one of a pair of utilization devices responsive to receipt of a corresponding one of a pair of ultrasonic control signals of different frequencies lying within a fixed frequency band and having predetermined minimum amplitudes and durations, said system being susceptible to spurious noise signals lying within said frequency band, comprising: a microphone for receiving and converting said ultrasonic control signals into corresponding electrical control signals; a transistor amplifier for amplifying said electrical control signals; a frequency discriminator coupled to said amplifier, said frequency discriminator including a transistor having a pair of tuned circuits in its output circuit, said tuned circuits being individually tuned to respective ones of the frequencies of said control signals; a pair of transistors having separate input circuits and separate output circuits with said input circuits coupled to said tuned circuits, respectively; an electromechanical discriminator comprising a pair of flux producing coils and a common armature having ends juxtaposed with respect to said coils, a pair of spaced fulcrums providing a stable platform for said armature; contact means associated with each said armature end operable responsive to movement of a selected one of said armature ends toward its respective flux producing coil to operate one of said utilization devices; one of said flux producing coils included in the output circuit of a first one of said pair of transistors and the other of said flux producing coils included in the output circuit of a second one of said pair of transistors; integrating means including capacitors connected across the output circuits of said pair of transistors for substantially preventing energization of said flux producing coils except for signals having said predetermined minimum amplitude and duration; the spacing of said fulcrums being dependent upon the signal to noise ratio of said frequency discriminator and the minimum control signal power desired to actuate said contact means.

6. In combination; translation means having a common input circuit and at least two output circuits for receiving and translating at least two control signals having predetermined individual characteristics and predetermined common characteristics; first means in said translation means for segregating said control signals according to said predetermined individual characteristics; second means in said translation means coupled to said first means for energizing respective ones of said output circuits responsive only to signals having said predetermined common characteristics; electromechanical means including at least two flux producing coils individually coupled to respective ones of said output circuits, said electromechanical means having a common armature movable in different directions in accordance with whichever one of said coils is energized, and including at least two pivot points for said armature; said pivot points being located such, that for at least a portion of said armature movement, the lever arm associated with the coil having the greater excitation is shorter than the lever arm associated with the coil having the lesser excitation; the ratio of lever arm lengths being dependent upon the signal to noise ratio of said translation means and the minimum control signal power desired to move said armature.

7. A remote control system for selectively energizing a pair of utilization devices responsive to receipt of one of a pair of control signals of different frequencies lying within a fixed frequency band, said system being susceptible to fortuitous noise signals lying within said frequency band, comprising: receiving means for receiving and amplifying signals within said frequency band; frequency discriminating means coupled to said receiving means for segregating said control signals on the basis of frequency, said frequency discriminating means having a first output circuit energizable responsive to a first of said control signals and a second output circuit energizable responsive to a second of said control signals; electromechanical discriminating means including a first flux producing coil coupled to said first output circuit, a second flux producing coil coupled to said second output circuit, and a common armature; said common armature being movable in different directions responsive to energization of respective ones of said flux producing coils; a pair of pivots for said common armature, said pivots being located such that for at least a portion of said armature movement the lever arm associated with the flux producing coil having the greater excitation is shorter than the lever arm associated with the flux producing coil having the lesser excitation; a pair of utilization devices individually and selectively energizable in response to said armature movements; said frequency discriminating means and said electromechanical discriminating means coacting to inhibit substantial movement of said armature in the presence of said fortuitous noise signals and to allow movement thereof in the presence of either one of said control signals, the ratio of the lengths of said lever arms being dependent upon the signal to noise ratio of said frequency discriminating means and the minimum control signal power desired to cause energization of said utilization devices.

8. A remote control system for selectively energizing one of a plurality of utilization devices responsive to receipt of a corresponding one of a plurality of control signals of different frequencies lying within a fixed frequency band, said system being susceptible to fortuitous noise signals lying within said band, comprising: receiving means for receiving and amplifying signals within said frequency band; discriminating means, coupled to said receiving means, including a corresponding plurality of tuned circuits, each tuned to the frequency of a different one of said plurality of control signals, for segregating said signals on the basis of frequency; said discriminating means having a plurality of output circuits individually energizable responsive to corresponding ones of said control signals; electromechanical discriminating means including a plurality of flux producing coils individually coupled to respective ones of said output circuits and energizable therefrom, and a common armature having ends adjacent to respective ones of said flux producing coils; a corresponding plurality of pivots about which said armature is adapted to be selectively moved, each said pivot being positioned adjacent to a respective one of said plurality of flux producing coils; a plurality of utilization devices individually and selectively energizable in response to movement of respective ends of said armature towards respective adjacent coils; said discriminating means and said electromechanical discriminating means coacting to inhibit movement of said armature in the presence of said fortuitous noise signals and allowing movement thereof in the presence of any single one of said control signals, said plurality of pivots being spaced such that for at least a portion of each said armature movement the moment arm of the electromagnetic force of the flux producing coil having the greater excitation is shorter than the moment arms of the electromagnetic forces of the flux producing coils having the lesser excitations; the ratios of said first mentioned moment arm to said second mentioned moment arms being dependent upon the signal to noise ratio of said discriminating means and the minimum control signal power desired to cause energization of said utilization devices.

9. A remote control system for selectively energizing three utilization devices responsive to receipt of corresponding ones of three control signals of different frequencies lying within a fixed frequency band, said system being susceptible to fortuitous noise signals lying within said frequency band, comprising: receiving means for receiving and amplifying signals within said frequency band; discriminating means coupled to said receiving means, including three tuned circuits each tuned to a frequency corresponding to one of said different control frequencies, for segregating said signals on the basis of frequency; said discriminating means having three output circuits individually energizable responsive to corresponding ones of said control signals; electromechanical discriminating means including three flux producing coils individually coupled to respective ones of said output circuits and energizable therefrom, and a common armature having three ends, each end being adjacent to a respective one of said three flux producing coils, said common armature resting upon three separate fulcrums each of which is adjacent to a respective one of said three flux producing coils; three utilization devices individually and selectively energizable in response to movement of respective ends of said armature toward respective adjacent coils, said discriminating means and said electromechanical discriminating means coacting to inhibit movement of said armature in the presence of said fortuitous noise signals and allowing movement thereof in the presence of any single one of said control signals; said plurality of fulcrums being spaced such that for each said armature movement the moment arm of the electromagnetic force of the flux producing coil having the greater excitation is shorter than the moment arms of the electromagnetic forces of the flux producing coils having the lesser excitations; the ratios of said first mentioned moment arm to said second mentioned moment arms being dependent upon the signal to noise ratio of said discriminating means and the minimum control signal power desired to cause energization of said utilization devices.

References Cited in the file of this patent

UNITED STATES PATENTS

| | | |
|---|---|---|
| 2,245,347 | Koch | June 10, 1941 |
| 2,398,419 | Finison | Apr. 16, 1946 |
| 2,398,681 | Weber | Apr. 16, 1946 |
| 2,436,224 | Ogle | Feb. 17, 1948 |
| 2,554,329 | Hammond | May 22, 1951 |
| 2,604,518 | Oliver | July 22, 1952 |
| 2,611,031 | Appert | Sept. 16, 1952 |
| 2,857,517 | Jorgenson | Oct. 21, 1958 |
| 2,871,463 | Beckwith | Jan. 27, 1959 |
| 2,909,606 | Wennemer | Oct. 20, 1959 |
| 2,923,918 | Adler | Feb. 2, 1960 |
| 2,954,545 | Drake | Sept. 27, 1960 |